(12) United States Patent
Ching (10) Patent No.: US 11,559,180 B2
(45) Date of Patent: Jan. 24, 2023

(54) FILTER SYSTEM AND A VACUUM CLEANER INCORPORATING A FILTER SYSTEM

(71) Applicant: Beacon Group (International) Ltd, Epsom (GB)

(72) Inventor: Michael Ching, Epsom (GB)

(73) Assignee: Beacon Group (International) Ltd, Epsom (GB)

( * ) Notice: Subject to any disclaimer, the term of this patent is extended or adjusted under 35 U.S.C. 154(b) by 351 days.

(21) Appl. No.: 16/466,708

(22) PCT Filed: Dec. 5, 2017

(86) PCT No.: PCT/GB2017/053659
§ 371 (c)(1),
(2) Date: Aug. 9, 2019

(87) PCT Pub. No.: WO2018/104721
PCT Pub. Date: Jun. 14, 2018

(65) Prior Publication Data
US 2021/0330158 A1 Oct. 28, 2021

(30) Foreign Application Priority Data
Dec. 5, 2016 (GB) .................................... 1620679

(51) Int. Cl.
*A47L 9/20* (2006.01)
*A47L 5/36* (2006.01)
(Continued)

(52) U.S. Cl.
CPC ................ *A47L 9/20* (2013.01); *A47L 5/365* (2013.01); *A47L 9/104* (2013.01); *A47L 9/122* (2013.01);
(Continued)

(58) Field of Classification Search
CPC ...... B01D 46/74; B01D 46/76; B01D 46/681; B01D 46/62; B01D 46/0002;
(Continued)

(56) References Cited

U.S. PATENT DOCUMENTS 2,645,303 A 7/1953 Meyerhoefer
2,823,762 A 2/1958 Bunnell
(Continued)

FOREIGN PATENT DOCUMENTS

DE 202013011464 3/2014
EP 1629761 3/2006
(Continued)

OTHER PUBLICATIONS

Machine translation of JP 2010-46207 (Year: 2010).*
(Continued)

*Primary Examiner* — Robert Clemente
(74) *Attorney, Agent, or Firm* — Meister Seelig & Fein LLP (57) ABSTRACT

A filter system for a vacuum cleaner is disclosed. The system comprises a housing reconfigurable relative to a bin between an operative configuration in which the housing is disposed upon the bin so that dirt separated from dirt-laden air can collect in the bin, and an idle configuration in which the housing is removed from the bin. The housing comprises an inlet for receiving dirt-laden air into the housing, an outlet via which cleaned air can exit the housing. The system further comprises first filtering means and second filtering means disposed within the housing, the first filtering means being positioned upstream of the second filtering means. The first and second filtering means comprises a filter medium configured to separate dirt from the dirt-laden air passing from the inlet to the outlet through the filter medium. The system further comprises filter cleaning means for removing
(Continued)

dirt from the filter medium of the first filtering means when the housing is configured at least in the operative configuration.

22 Claims, 5 Drawing Sheets (51) Int. Cl.
| | |
|---|---|
| *A47L 9/10* | (2006.01) |
| *A47L 9/12* | (2006.01) |
| *A47L 9/14* | (2006.01) |
| *A47L 9/18* | (2006.01) |
| *B01D 46/00* | (2022.01) |
| *B01D 46/10* | (2006.01) |
| *B01D 46/24* | (2006.01) |
| *B01D 46/42* | (2006.01) |
| *B01D 46/48* | (2006.01) |
| *B01D 46/52* | (2006.01) |
| *B01D 46/62* | (2022.01) |
| *B01D 46/69* | (2022.01) |
| *B01D 46/74* | (2022.01) |
| *B01D 46/681* | (2022.01) |

(52) U.S. Cl.
CPC ............ *A47L 9/127* (2013.01); *A47L 9/1409* (2013.01); *A47L 9/1463* (2013.01); *A47L 9/183* (2013.01); *B01D 46/0002* (2013.01); *B01D 46/0034* (2013.01); *B01D 46/0056* (2013.01); *B01D 46/10* (2013.01); *B01D 46/2403* (2013.01); *B01D 46/4245* (2013.01); *B01D 46/48* (2013.01); *B01D 46/521* (2013.01); *B01D 46/62* (2022.01); *B01D 46/681* (2022.01); *B01D 46/69* (2022.01); *B01D 46/74* (2022.01); *B01D 2267/40* (2013.01); *B01D 2279/55* (2013.01)

(58) Field of Classification Search
CPC ............ B01D 46/0034; B01D 46/0056; B01D 46/10; B01D 46/2403; B01D 46/4245; B01D 46/48; B01D 46/521; B01D 2267/40; B01D 2279/55; A47L 9/20; A47L 5/365; A47L 9/104; A47L 9/122; A47L 9/127; A47L 9/1409; A47L 9/1463; A47L 9/183

See application file for complete search history.

(56) References Cited

U.S. PATENT DOCUMENTS

| | | | | |
|---|---|---|---|---|
| 2009/0205498 | A1* | 8/2009 | Wang | .................. B01D 46/521 |
| | | | | 95/279 |
| 2012/0159738 | A1* | 6/2012 | Hwang | .................. A47L 9/108 |
| | | | | 15/347 |

FOREIGN PATENT DOCUMENTS

| | | |
|---|---|---|
| JP | 2010046207 | 3/2010 |
| JP | 2010046207 A | 3/2010 |
| KR | 1020140136814 | 12/2014 |

OTHER PUBLICATIONS

United Kingdom Intellectual Property Office, Search Report under Section 17(5), dated Apr. 27, 2017, UK.

European Patent Office, WO 2018/104721 International Search Report, dated Mar. 29, 2018, EP.

\* cited by examiner

FILTER SYSTEM AND A VACUUM CLEANER INCORPORATING A FILTER SYSTEM

The present invention relates to a filter system and particularly, but not necessarily exclusively, to a filter system for use in a vacuum cleaner. The invention also relates to a vacuum cleaner incorporating such filter system.

It is well known that filter systems are mounted in cleaning devices including vacuum cleaners. Known filter systems may take different forms and sizes and most commonly include a filter medium such as a membrane positioned in an air duct of a cleaning device. The structure of the membrane is intended to allow air to pass therethrough, while blocking larger particles of dirt entrained in the air flow. Such filtering is important in order to effectively separate dust and dirt, or to prevent critical components of the cleaning device from becoming blocked with dust and dirt.

Filtering systems mounted in commercial vacuum cleaners typically include a housing having an air inlet and outlet. The housing may be positioned over an opening of a bin, such as a bag or a wheelie bin, to provide storage for filtered dirt. In vacuum cleaners, it is necessary to prevent dirt from reaching a motor of the vacuum cleaner, as the particles of dirt may clog the motor which may cause failure thereof. It is also necessary to ensure that dirt and waste drawn into the nozzle of the vacuum cleaner is retained in the bin. This is usually achieved by providing a first filter which typically covers the opening of a bin so as to allow air to pass therethrough and to block and retain dirt and waste in the bin at the same time. A second filter suitable for filtering finer particles of dirt, is connectable to the air outlet in the filter system housing upstream of the motor.

However, traditional filtering systems described above tend to get blocked with particles of dirt over time which reduces their permeability to air, thereby diminishing the suction power of the vacuum cleaner. In order to clean the filtering system by removing the particles of dirt blocking the filter medium, it is typically necessary to open the cover or dismantle the housing of the vacuum cleaner and to manually shake the dust off the filter medium.

It is an object of the present invention to provide a technical solution to at least some of the issues outlined above and provide an improved filtering system with automated self-cleaning mechanism without the need to open the cover or dismantle the housing of the vacuum cleaner.

In accordance with a first aspect of the present invention, there is provided a filter system for a vacuum cleaner, the system comprising a housing reconfigurable relative to a bin, between an operative configuration in which the housing is disposed upon the bin so that dirt separated from dirt-laden air can collect in the bin, and an idle configuration in which the housing is removed from the bin, the housing comprising an inlet for receiving dirt-laden air into the housing, an outlet via which cleaned air can exit the housing, the system further comprising:

first filtering means and second filtering means, wherein the first and second filtering means are disposed within the housing, the first filtering means being positioned upstream of the second filtering means, the first and second filtering means comprise a filter medium configured to separate dirt from the dirt-laden air passing from the inlet to the outlet through the filter medium; and, filter cleaning means for removing dirt from the filter medium of the first filtering means when the housing is configured at least in the operative configuration, wherein the filter cleaning means comprises driving means configured to control and couple the filter cleaning means to the filter medium of the first filtering means, the driving means comprising a battery or an engine coupling, configured to power the driving means.

The driving means may further comprise a switch or a timer configured to activate the driving means.

In an embodiment, the first filtering means comprise a panel having a plurality of apertures defining a mesh, the panel being adapted to cover at least a portion of the opening of the bin in the operative configuration of the housing. The panel further comprises a first panel portion and a second panel portion, each portion comprising a respective port. The first panel portion and the second panel portion are positioned substantially parallel to each other. At least one panel portion is movable between a first position in which the ports of the first panel portion and the second panel portion are substantially aligned to form a through-hole, and a second position in which the port in the first panel portion or the second panel portion is covered by at least a portion of the second panel portion or the first panel portion, respectively. The driving means may further be configured to move the first panel portion or the second panel portion of the panel between the first position and the second position so as to agitate and remove dirt from the filter medium. The filter cleaning means may further comprise a brush positioned adjacent the movable panel portion so that the movable panel portion moves in sliding contact with bristles of the brush to remove dirt from the filter medium.

In an embodiment, the second filtering means comprise a cylindrical drum having a corrugated or concertina shape outer surface. The outer surface preferably comprises the filter medium, the cylindrical drum being disposed within the housing so that a longitudinal axis of the drum extends substantially across the opening of the bin. The drum comprises a channel which extends along the longitudinal axis, and is fluidly coupled at one end thereof to the outlet of the housing. The filter cleaning means may further comprise a protuberance configured to contact of the outer surface of the drum. The driving means may be configured to rotate the drum about the longitudinal axis thereof so that the protuberance contacts the outer surface of the drum upon rotation such that the dirt in the filter medium is agitated and can fall into the bin. The driving means further comprises a plurality of elongated rollers positioned substantially parallel to each other and to the longitudinal axis of the drum such that the drum abuts the rollers. The driving means further comprises a driving belt coupled to the rollers so as to drive the rotation of the drum via the rotation of the rollers.

In an embodiment, the driving means is further configured to rotate the drum when the first panel portion and the second panel portion of the panel are in the first position thereby allowing at least a portion of the dirt to fall through the at least one through-hole into the bin.

In an embodiment, the housing comprises spraying means adapted to spray the housing and/or an interior of the bin with a liquid, such as an aerosol, so as to suppress the dust, the spraying means may be activated automatically upon reconfiguring the housing from the operative configuration into the idle configuration.

In accordance with a second aspect of the present invention, there is provided a vacuum cleaner comprising a ducting arrangement for communicating an air flow from an inlet to an outlet thereof, an impeller for creating an air flow along the ducting arrangement, and a bin for collecting dirt separated from the air flow, a filter system according to the first aspect positioned over an opening of the bin, the inlet and the outlet of the filter system being connected to the ducting arrangement.

In an embodiment, the vacuum cleaner further comprises a chamber having an electromagnet, the chamber being positioned so as to allow air passing via the ducting arrangement to pass through the chamber, the electromagnet being configured to capture metal objects carried by the air through the chamber. The vacuum cleaner may further comprise a receptacle positioned adjacent the chamber which is arranged to receive metal objects. The receptacle is arranged to capture the metal objects when the electromagnet is switched off. The vacuum cleaner may also comprise a further filter disposed within the ducting arrangement and a chassis having at least two wheels, the chassis being adapted to accommodate a wheelie bin.

In an embodiment, the impeller is operable to cause the air to flow in a forward and a reverse direction along the ducting arrangement, such that the vacuum cleaner can operate as an air blower.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described with reference to the accompanying drawings, in which.

Figure 1:
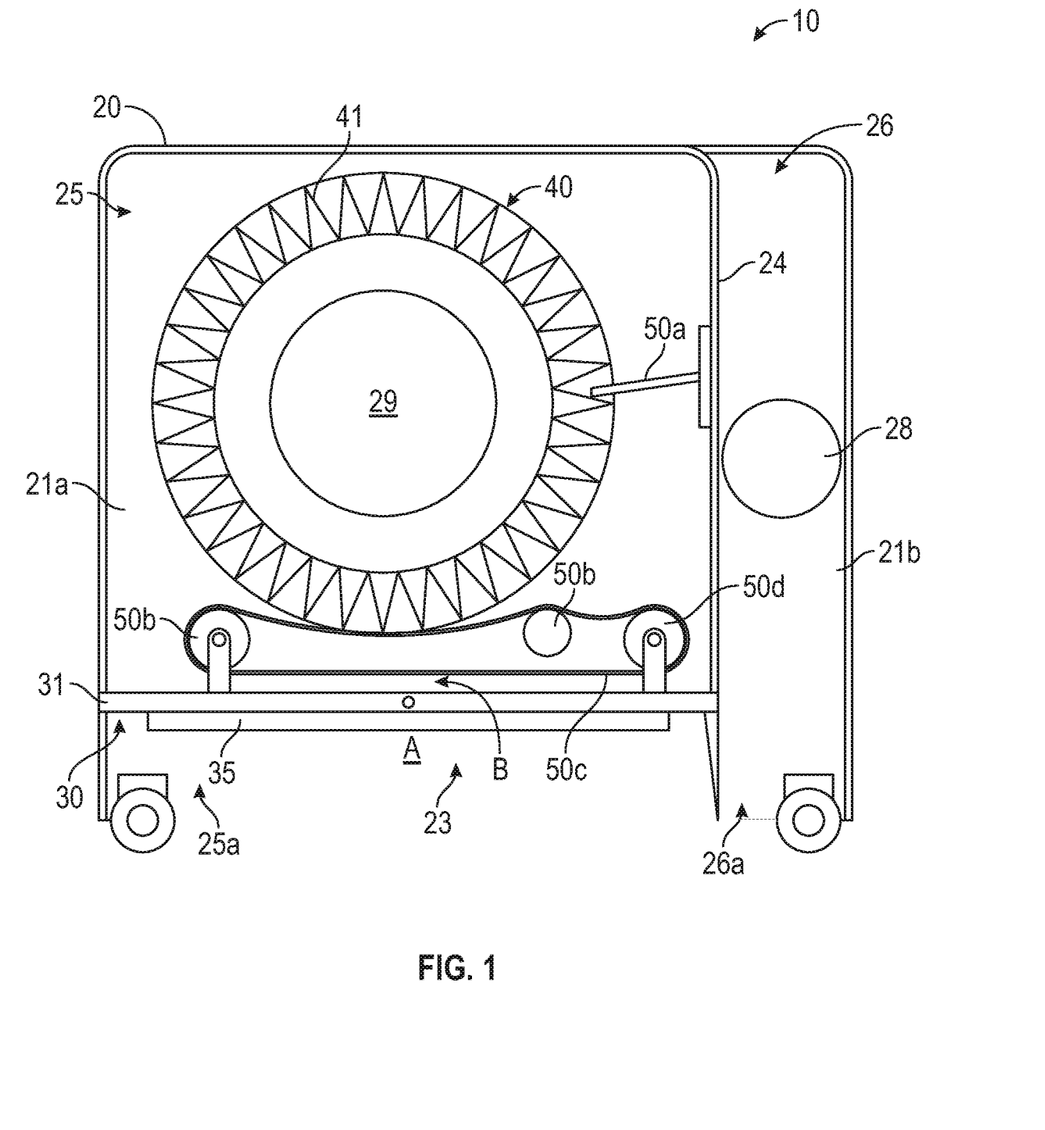
FIG. 1 is a cross-sectional view of the filtering system according to an embodiment of the present invention.
Figure 2:
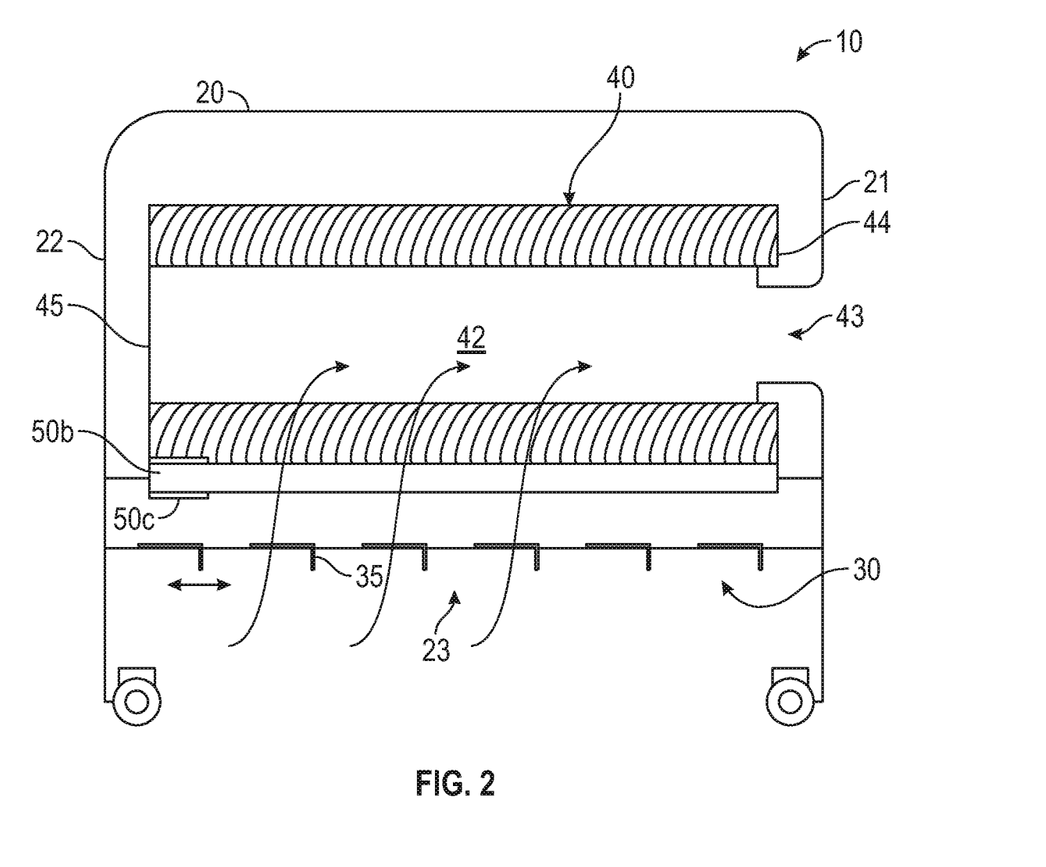
FIG. 2 is a further cross-sectional view of the filtering system according to an embodiment of the present invention.

Referring to FIGS. 1 and 2 of the drawings there is illustrated a filtering system 10 according to an embodiment of the present invention for use with a vacuum cleaner. The filtering system is configured to self-clean without the need to open a cover or dismantle a housing of the vacuum cleaner to provide access to the filter system. The filtering system comprises a housing 20 having a first and second housing wall 21, 22 arranged in spaced relation The housing 20 is reconfigurable between a operative configuration in which the housing 20 is secured to a bin, such that the mounting aperture is arranged adjacent an opening of the bin, and an idle configuration in which the housing 20 is removed from the bin, so that the dirt can be removed therefrom, for example. The housing 20 comprises a partition 24 disposed therein which divides the interior of the housing 20 into at least a first chamber 25 and a second chamber 26. The first chamber 25 and the second chamber 26 comprise a respective opening 25*a*, 26*a*. The chamber openings 25*a*, 26*a* and the mounting aperture 23 are substantially co-planar. The reconfiguration of the housing may be effected by a fitted hinge mechanism 127 that allows the housing to be pivoted about the hinge, relative to the bin. The housing 20 may be made of any rigid material, such as metal or plastics material.

The housing 20 further comprises an inlet 28 which is configured for receiving dirt-laden air into the housing and an outlet 29 via which cleaned air can exit the housing. In particular, the inlet may have a diameter of at least 80-100 mm. The filtering system with the inlet of such size is in particular suited for being disposed upon wheelie bins of square or rectangular cross-section and having capacity of at least 120 l. The inlet may be further connected to a flexible hose or duct. The hose or duct may in particular have a length of at least 1.2 m and a diameter of at least 80 mm. The filtering system may also be sized to be disposed upon a wheelie bin having a capacity of 240 l or 360 l.

In particular, the outlet 29 is disposed within a wall of the housing defining the first chamber 25, and the inlet 28 is disposed within a wall of the housing defining the second chamber 26. The outlet 29 may be disposed on portion of the first housing wall 21, for example, and the inlet 28 may be disposed on a portion of the second housing wall 22, for example. The inlet 28, first and second chamber openings 25*a*, 26*a* and the outlet 29 are configured to communicate a flow of air from the inlet 28 via the chamber openings 25*a*, 26*a* to the outlet 29.

Figure 3:
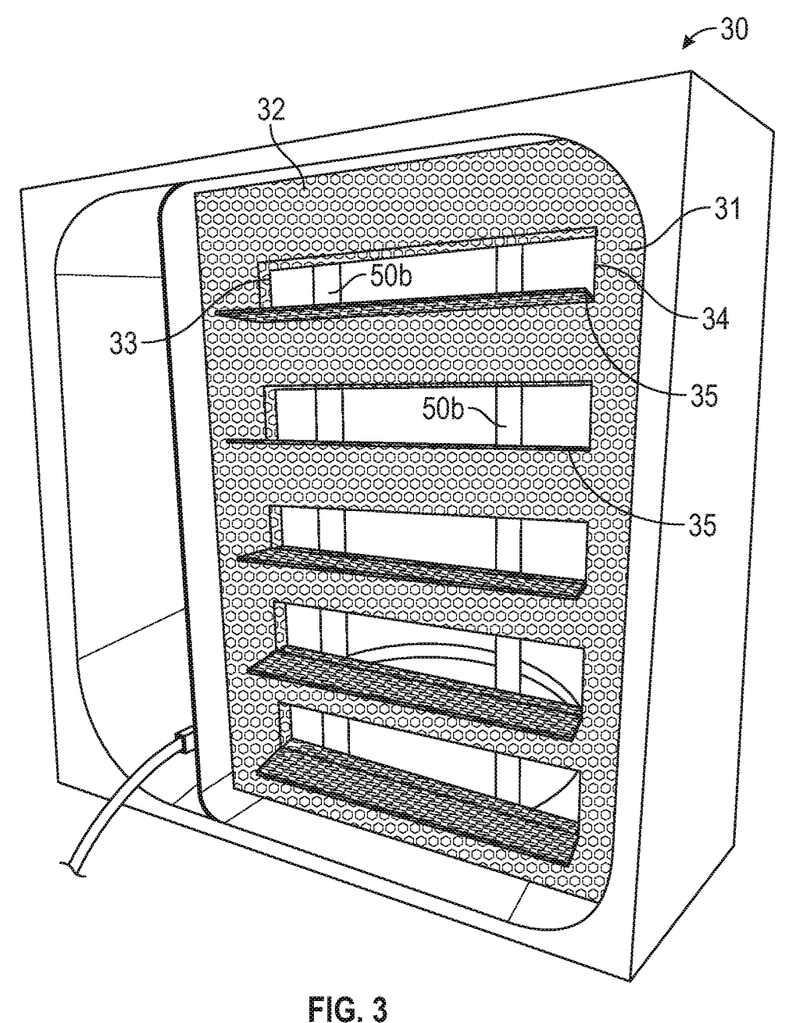
FIG. 3 is a front view of the panel portions of the panel of the filtering means in the operative configuration.
Figure 4:
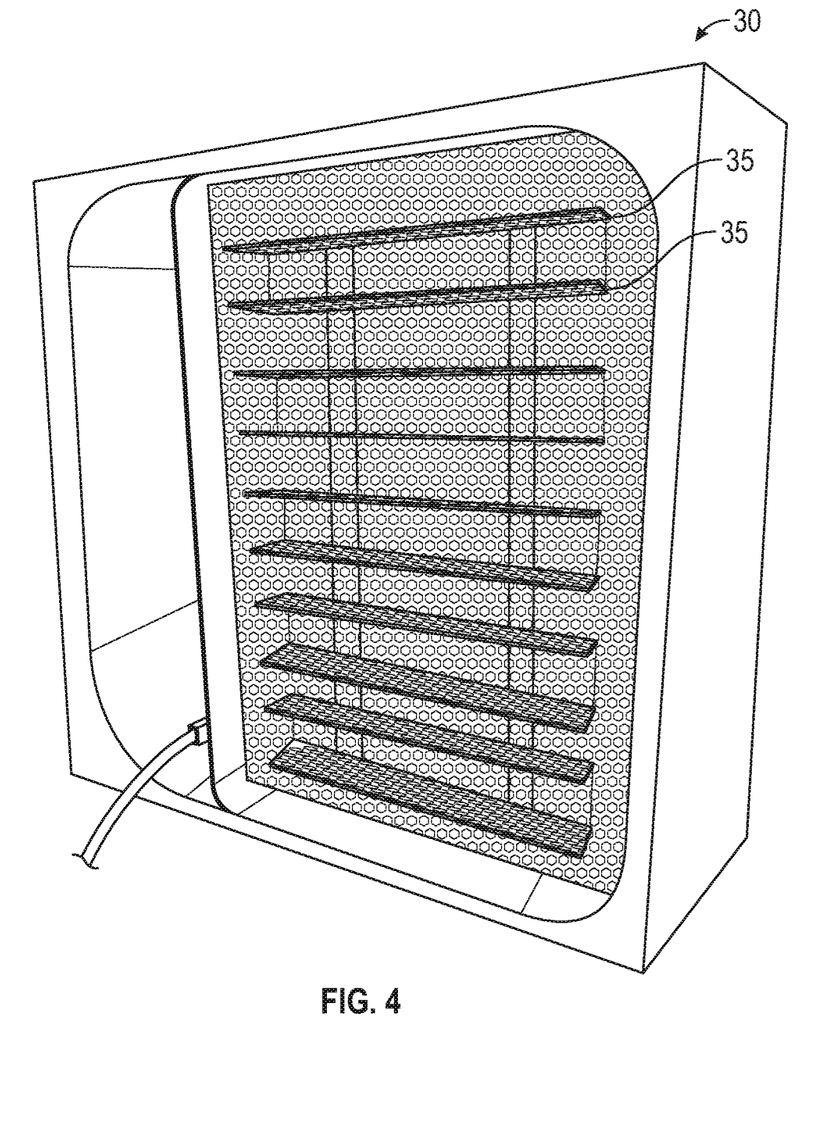
FIG. 4 is a front view of the panel portions of the panel of the filtering means in the idle configuration.

Referring to FIGS. 3 and 4 of the drawings there is illustrated the first filtering means 30. The first filtering means 30 comprises a filter medium configured to separate dirt from the dirt laden air passing from the inlet 28 to the outlet 29. The first filtering means 30 may comprise a rectangular panel 31 having a plurality of apertures defining a mesh, the panel 31 being adapted to cover at least a portion of the opening of the bin when the housing 20 is configured in the operative configuration. The mesh comprises the filter medium so that air is allowed to pass via the apertures of the mesh while larger particles of dust and waste are retained on an upstream side A of the panel 31 (see FIG. 1 of the drawings). The panel 31 is removably positioned in the first chamber 25 and located upstream of the outlet 29. In particular, the panel 31 is positioned so as to cover the first chamber opening 25*a* in order to ensure that the whole flow of dirt-laden air passes through the panel 31.

The panel 31 may further comprise a first panel portion 32 and a second panel portion 33, the portions 32, 33 being positioned substantially parallel to each other and each portion 32, 33 comprising a plurality of ports 34. The ports 34 may be of rectangular shape (although the skilled reader will recognise that other shaped ports may also be exploited) and at least one of the panel portions 32, 33, for example panel portion 32, further comprise a plurality of flanges 35 which separately extend from a side of the ports formed in panel portions 32, through adjacent ports formed in the adjacent panel portion 33. The panel portions 32, 33 are permitted to slide relative to each other and are reconfigurable between a first relative position in which the ports 34 within the panel are substantially aligned to form a through hole within the panel 31, and a second relative position in which the ports in the panel portions 32, 33 are misaligned relative to each other and closed by the adjacent panel portion 33, 32. The flanges 35 which extend from the panel portion 32 for example, are arranged to contact opposing edges of the ports formed in the panel portion 33 and thus limit the extent of relative movement between the panel portions 32, 33. When configured in the first relative position, and with the housing arranged in the operative configuration, the through-hole is arranged to allow dirt and waste accumulated on the downstream side B of the panel 31 to drop into the bin The housing 20 further comprises second filtering means disposed within the first chamber 25 of the housing 20, downstream from the first filtering means 30. The second filtering means comprise a cylindrical drum 40 having an outer curved surface which may be corrugated or comprise a plurality of concertina folds 41, such that the corrugations or concertina folds 41 in the outer surface extend substantially parallel to a longitudinal axis of the drum 40. The drum 40 further comprises a channel 42 which extends from an opening 43 formed in one end wall 44 thereof along the longitudinal axis of the drum 40. An opposite end of the drum is closed via an opposing end wall 45.

The opening 43 formed in the end wall 44 is sealed and coupled to the outlet 29 in the housing 20. The end walls 44, 45 further comprise attaching means (not shown) adapted to secure the drum 40 to the walls of the first chamber 25. In particular, the attaching means is configured to position the cylindrical member in the first chamber 25 so that the longitudinal axis of the cylindrical member 40 extends across the opening of the bin. Furthermore, the attaching means is configured to enable the drum 40 to rotate about the longitudinal axis thereof. The corrugations or folds 41 are formed of a material that is permeable to air and impermeable to dust, such and thus provide the required filtration.

The housing 20 further includes the filter cleaning means which is adapted to agitate dirt accumulated in the filter medium of the first filtering means when the housing is configured at least in the operative configuration. The filter cleaning means comprise the driving means which may be activated by a switch or a timer and which are configured to move the first panel portion or the second panel portion of the panel between the first position and the second position so as to agitate and remove the dirt deposited thereon. In particular, the first panel portion 32 or the second panel portion 33 is configured to reciprocate relative to the other portion. For example, the first panel portion may be coupled to a drive plate via a connecting rod or belt, the drive plate being configured to rotate back and forth about a rotational axis through an angular range to cause the first panel portion to slide back and forth relative to the second panel portion. The extent of the motion is constrained by the width of the ports 34 of the first panel portion 32 in which the flanges 35 of the second panel portion 33 reciprocate. The filter cleaning means may further comprise a protuberance 50*a* that may be attached to the wall 24 of the first chamber of the housing. The driving means may further be configured to rotate the cylindrical member 40 about the longitudinal axis thereof so that the protuberance 50*a* contacts the folds 41 of the outer surface of the drum 40 upon rotation thereof, such that any dirt accumulated therein becomes agitated and dislodged.

In an embodiment, the driving means may comprise a plurality of elongated rollers 50*b* positioned substantially parallel to each other and to the longitudinal axis of the drum 40 such that the drum 40 abuts the rollers 50*b*. The ends of the rollers 50*b* may be attached to the first and second housing walls 21, 22 and a belt 50*c* may be coupled to the rollers 50*b* and to a motor or engine 50*d* of the vacuum cleaner when the filtering system 10 is in use to drive the rotation of the cylindrical member 40 via the rotation of the rollers 50*b*. A battery (not shown) or an electromagnetic shaker (not shown) may also or alternatively be provided to power the driving means. To further enhance the cleaning action, the filter cleaning means may comprise a brush (not shown) positioned adjacent the movable panel portion and attached to the wall in the first chamber 25, so that the movable panel portion moves past the brush in sliding contact therewith. In this manner, any dirt on the mesh is removed by the brush. The brush may also be coupled to the driving means on the downstream side B of the panel 31 and reciprocate along the panel 31 when the panel portions 32, 33 are in the first position so that the dirt accumulated on the downstream side B of the panel 31 is moved to fall through one of the through-holes into the bin.

The housing 20 may further comprise spraying means (not shown) adapted to spray the interior of the housing 20 and/or an interior of the bin with a liquid, such as an aerosol or mist, so as to suppress the dust. The spraying means may be attached to any of the walls within the housing 20, and may comprise a nozzle directed towards the bin so that the contents of the bin become sprayed with the aerosol. The spraying means may comprise a refillable liquid container disposed within the housing 20, the nozzle being fluidly connected thereto via a conduit. Alternatively, the source of the liquid may be external to the housing so that the liquid is communicated to the nozzle via an access port formed in the housing.

Figure 5:
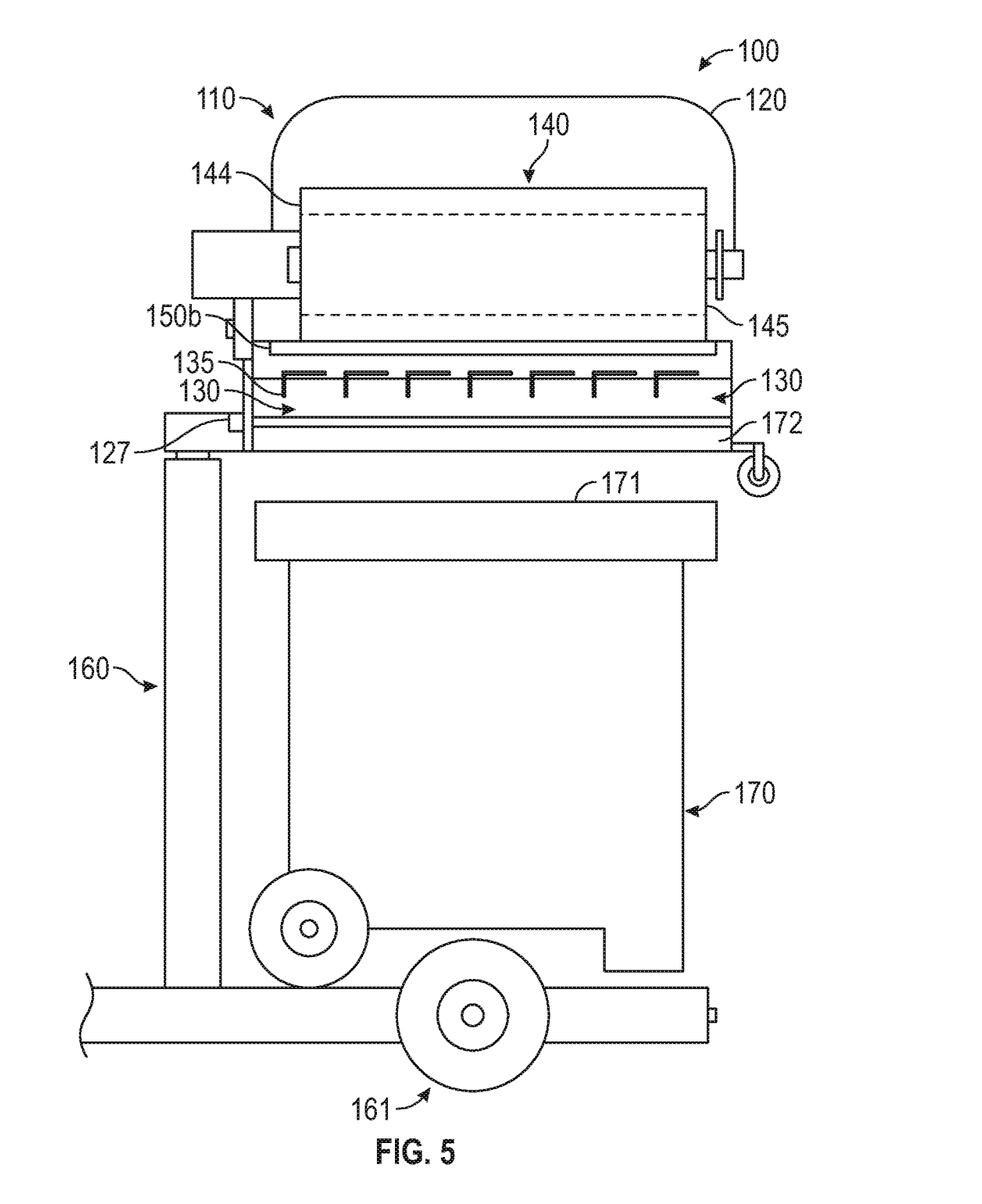
FIG. 5 is a side view of the vacuum cleaner according to an embodiment of the present invention.

The filter system 10 of the present invention may be incorporated in a vacuum cleaner 100 as partially shown in FIG. 5 of the drawings. The vacuum cleaner 100 may be suitable for indoor use, for example in houses to remove dirt and like from floors, rugs and other house surfaces. The vacuum cleaner 100 may also be adapted for use outdoors, such as on the streets or in industrial areas, to remove dirt, dust and larger particles of waste, including drinking cans and plastic bags. In the illustrated embodiment, the vacuum cleaner 100 comprises a rigid chassis 160 having a width of approximately 1 m and a length of approximately 1.8 m, and at least two wheels 161 to provide mobility. The chassis 160 may take various forms and sizes but in general is adapted to accommodate a bin. The chassis 160 of outdoor, industrial vacuum cleaners may be adapted to accommodate a wheelie bin 170 for example, so that there is no need for a separate bin specifically for the vacuum cleaner 100 when the cleaner is operated on the streets. In particular, the chassis 160 may comprise a platform 173 which is configured to provide support for the wheelie bin 170 such that the bin 170 may rest on the platform. In an alternative embodiment, the filtering system may be secured to the bin such that the bin is clamped into position under the housing. The vacuum cleaner further comprises a ducting arrangement (not shown) including a network of conduits adapted to communicate an air flow from an inlet to an outlet thereof. An impeller (not shown) is provided to create an air flow along the conduits of the ducting arrangement, so that air is drawn into the inlet in the ducting arrangement and is communicated to the outlet thereof. The filter system 10 is positioned over an opening 171 of the bin 170 so that the mounting aperture 23 of the housing 20 forms an air-tight seal 172 with the opening 171 of the bin in the o configuration of the housing 20. The inlet and the outlet of the filter system are connected to the ducting arrangement so that dirt-laden air may be communicated to the filtering system 10 from the inlet and cleaned air may be communicated out from the filtering system 10 via the outlet.

In order to enable the vacuum cleaner 100 to separate metal objects, including hypodermic needles for example, from the general waste conveyed by dirt-laden air, a chamber (not shown) may be provided having an electromagnet, the chamber being positioned so as to allow air passing via the ducting arrangement to pass through the chamber. The electromagnet is configured to capture metal objects which enter the chamber. The electromagnet may be powered from the general power source (not shown) of the vacuum cleaner such as mains connection or alternatively may be powered from a separate battery (not shown) disposed within the vacuum cleaner. The vacuum cleaner may further comprise a receptacle (not shown) adapted to accommodate the metal objects and is positioned adjacent the chamber so that when the electromagnet is switched off, the metal objects captured by the electromagnet are released and can fall into the receptacle.

In an embodiment, the vacuum cleaner may also comprise a high efficiency particulate air filter (not shown) adapted to filter very small (such as around 0.3 µm in size) pollutants and particles and is disposed within the ducting arrangement, in particular downstream of the filtering system 10 and proximate the outlet of the ducting arrangement.

In an embodiment, the impeller may be operable to cause the air to flow in a forward and reverse direction along the ducting arrangement, so that the cleaner may be operated in a suction mode to remove waste, and also in a blowing mode where waste can be suitably removed from a particular location or gathered for collection with the cleaner.

The filtering system 10 is designed to be used with vacuum cleaners 100 to provide efficient filtering of dirt from dirt-laden air passing through the filtering system 10. Referring to FIG. 5 of the drawings, there is illustrated the housing 120 in the operative configuration, which is secured to the bin 170 by forming a seal 172 between the mounting aperture of the housing 120 and the opening 171 of the bin 170. In the idle configuration, the housing 120 is lifted from the bin 170, in particular by means of a hinge 127, so that the bin 170 may be removed and emptied. When the filtering system 110 is in use and the housing 120 configured in the operative configuration, dirt-laden air comprising dust, dirt or waste collected from surfaces to be cleaned is communicated to the inlet 28 in the second chamber 26 of the housing 120 of the filtering system 110. Downstream from the inlet 28, dirt-laden air passes via the second chamber opening 26a, through the interior of the bin 170, and further downstream via the first chamber aperture 25a and the panel portions 32, 33 in the second position located in the first chamber 25 of the housing 120. Air passes freely via the plurality of apertures in the mesh of the panel 31, while dirt and waste of the diameter larger than the diameter of the plurality of apertures in the panel 31 are blocked by the panel 31 on the upstream side A thereof. The dirt and waste blocked by the panel 31 are retained in the bin 170 below the panel.

It is desirable to provide the vacuum cleaner with the ability to collect sharp metal objects, such as needles or pins, from the cleaned surfaces into a separate container (not shown). Such objects gathered in general bins typically used with vacuum cleaners may rip the surface of the bin and consequently cause the contents of the bin to fall through the holes thereby created. The sharp objects of this type may also pose a hazard to workers employed to further process the waste in the bin. The vacuum cleaner may activate a "sharp objects" mode by means of a switch (not shown), which switches on the electromagnet in the chamber. The needles sucked via the inlet of the ducting arrangement are communicated to the chamber and the electromagnet disposed therein is subsequently switched on so that a magnetic field is created in the chamber. When the needles pass via the chamber, the attractive force created by the magnetic field pulls the needles towards the electromagnet which retains the needles on the surface thereof. The user may then switch off the "sharp objects" mode which in turn switches off the electromagnet. As the magnetic force no longer acts upon the needles, the needles are dropped into the receptacle.

Air passing from the chamber is subsequently communicated toward the first chamber 25 where the air can pass through the corrugations or concertina folds of the drum 140. Smaller particles of dust, dirt or waste thus become separated. In particular, dust which is not filtered by the panel 31 of the first filtering means is retained between the folds 41 of the drum 40. This is important to protect sensitive components (not shown) of the impeller or the motor in the vacuum cleaner from being blocked by the dust or dirt. The air filtered by the folds of the drum 140 subsequently enters the channel 42 thereof and is communicated out of the filtering system 110 via the outlet 29 at the end of the channel 42.

Over time, when the filtering system is in use, dust and other finer particles of dirt are found to accumulate upon the mesh panel 31 and the outer surface of the drum 140. The accumulation of dirt reduces the air flow through the filtering system 110 and thus reduces the efficiency of the vacuum cleaner 100, as well as suction power thereof. In this case, for example when the user notices a reduction in suction for example, or as a part of scheduled maintenance operation which may be activated by the timer, the impeller of the vacuum cleaner is switched off to stop the flow of air along the filtering system. The driving means is then activated to drive the belt 50c coupled to the rollers 150b in the first chamber 25 of the housing 120. Driving of the belt 50c rotates the rollers 150b, which in turn rotate the drum 140 by virtue of the contact therebetween. The rotation of the drum 140 causes the folds 41 on the outer surface of the drum 140 to contact the protuberance 50a, which may comprise resilient flap of rubber, for example, attached to an interior of the wall 24 of the first chamber 25. The flap 50a is thus arranged to agitate the folds 41 and dislodge dust and dirt accumulated therebetween.

The belt 50c is also coupled to at least one of the panel portions 32, 33 so that when the belt 50c is activated, the belt 50c drives the first panel portion 32 so that the flanges 35 associated with the ports 34 in the first panel portion 32 reciprocate back and forth along a respective port 34 of the second panel portion 33. The reciprocating motion of the first panel portion 32 relative to the second panel portion 33 agitates and shakes off dust and dirt accumulated thereon to restore the air flow through the apertures of the mesh. The reciprocating motion of the first panel portion 32 may be supplemented by positioning the brush adjacent the moving first panel portion 32 so that fibres of the brush further act to remove any residual dirt for example, from the mesh Before activating the rotation of the drum 140, the panel portions 32, 33 may be reconfigured into the first position so that at least one through hole is formed in the panel 31. The subsequent rotation and cleaning of the drum 140 by means of the flap 50a then enables the dust and dirt to fall straight through the through hole formed in the panel 31, rather than collecting upon the panel 31.

Following a cleaning of the outer surface of the drum 140 and the panel 31 the driving of the belt 50c is deactivated. The rotation of the drum 140 and/or the reciprocating relative movement of the panel portions 32, 33 subsequently stops and the impeller of the vacuum cleaner 100 may be switched on again so that the circulation of air in the ducting arrangement and the filtering system 110 is restored.

In an alternative embodiment, it may be desirable to blow air out from the nozzle of the vacuum cleaner, so that dirt and waste may be suitably gathered for collection, for example. In this case, the impeller of the vacuum cleaner may then be operated to rotate in a reverse direction to cause the air to flow in the opposite direction within the ducting arrangement. In this case, air is forced out via the inlet of the ducting arrangement.

From the foregoing therefore, it is evident that the filtering system provides an effective means of cleaning filters disposed therein without the requirement to open a cover of the vacuum cleaner for example.

The invention claimed is:

1. A filter system for a vacuum cleaner, the system comprising:
   a housing reconfigurable relative to a bin between an operative configuration in which the housing is disposed upon the bin so that dirt separated from dirt-laden air can collect in the bin, and an idle configuration in which the housing is removed from the bin, the housing comprising an inlet for receiving dirt-laden air into the housing, and an outlet via which cleaned air can exit the housing;
   the system further comprising:
      first filtering means and second filtering means, wherein the first and second filtering means are disposed within the housing, the first filtering means being positioned upstream of the second filtering means, the first and second filtering means comprise a filter medium configured to separate dirt from the dirt-laden air passing from the inlet to the outlet through the filter medium;
      filter cleaning means for removing dirt from the filter medium of the first filtering means when the housing is configured at least in the operative configuration, wherein the filter cleaning means comprise driving means configured to control and couple the filter cleaning means to the filter medium of the first filtering means, the driving means comprising a battery or an engine coupling, configured to power the driving means.

2. The filter system according to claim 1, wherein the first filtering means comprise a panel having a plurality of apertures defining a mesh, the panel being adapted to cover at least a portion of the opening of the bin in the operative configuration of the housing.

3. The filter system according to claim 2, wherein the panel comprises a first panel portion and a second panel portion, each portion comprising a respective port.

4. The filter system according to claim 3, wherein the first panel portion and the second panel portion are positioned substantially parallel to each other.

5. The filter system according to claim 3, wherein at least one panel portion is movable relative to the second panel portion between a first position in which the ports of the first panel portion and the second panel portion are substantially aligned to form a through-hole, and a second position in which the port in the first panel portion or the second panel portion is covered by at least a portion of the second panel portion or the first panel portion, respectively.

6. The filter system according to claim 5, wherein the driving means are further configured to move the first panel portion relative to the second panel portion between the first position and the second position so as to agitate and remove dirt from the filter medium.

7. The filter system according to claim 6, wherein the filter cleaning means comprise a brush positioned adjacent the movable panel portion so that the movable panel portion moves in sliding contact with bristles of the brush to remove dirt from the filter medium.

8. The filter system according to claim 1, wherein the second filtering means comprise a cylindrical drum having a corrugated or concertina shape outer surface.

9. The filter system according to claim 8, wherein the drum comprises a channel which extends along a longitudinal axis of the drum and is fluidly coupled at one end thereof to the outlet of the housing.

10. The filter system according to claim 8, wherein the filter cleaning means comprises a protuberance configured to contact the outer surface of the drum.

11. The filter system according to claim 10, wherein the driving means is configured to rotate the drum about a or the longitudinal axis thereof, so that the protuberance contacts the outer surface of the drum upon rotation such that the dirt in the filter medium is agitated and can fall into the bin.

12. The filter system according to claim 11, wherein the driving means further comprises a plurality of elongated rollers positioned substantially parallel to each other and to the longitudinal axis of the drum such that the drum abuts the rollers, the driving means further comprising a driving belt coupled to the rollers so as to drive the rotation of the drum via the rotation of the rollers.

13. The filter system according to claim 11 when claim 8 is appended to claim 6, wherein the driving means is further arranged to rotate the drum when the first panel portion and the second panel portion of the panel are in the first position thereby allowing at least a portion of the dirt to fall through the at least one through-hole into the bin.

14. The filter system according to claim 1, wherein the housing comprises spraying means adapted to spray the housing and/or an interior of the bin with a liquid so as to suppress the dust.

15. The filter system according to claim 14, wherein the spraying means is activated automatically upon reconfiguring the housing from the operative configuration into the idle configuration.

16. The filter system according to claim 2, wherein the driving means further comprise a switch or a timer configured to activate the driving means.

17. A vacuum cleaner, comprising:
   a ducting arrangement for communicating an air flow from an inlet to an outlet thereof;
   an impeller for creating an air flow along the ducting arrangement, and
   a bin for collecting dirt separated from the air flow;
   a filter system according to claim 1, the inlet and the outlet of the filter system being connectable within the ducting arrangement.

18. The vacuum cleaner according to claim 17, further comprising a chamber having an electromagnet, the chamber being positioned so as to allow air passing via the ducting arrangement to pass through the chamber, the electromagnet being configured to capture metal objects carried by the air through the chamber.

19. The vacuum cleaner according to claim 18, further comprising a receptacle arranged to receive metal.

20. The vacuum cleaner according to claim 17, further comprising a further filter disposed within the ducting arrangement.

21. The vacuum according to claim 17, further comprising a chassis having at least two wheels, the chassis being adapted to accommodate a wheelie bin.

22. The vacuum cleaner according to claim 17, wherein the impeller is operable to cause the air to flow in a forward and reverse direction along the ducting arrangement.

\* \* \* \* \*